INVENTORS,
HENRY P. LEMAIRE &
LLOYD B. SMITH
BY
Carl V. Olson
ATTORNEY

INVENTORS
HENRY P. LEMAIRE &
BY LLOYD B. SMITH

Carl V. Olson
ATTORNEY

United States Patent Office 3,273,134
Patented Sept. 13, 1966

3,273,134

PRINTED CIRCUIT ASSEMBLIES OF MAGNETIC CORES

Henry P. Lemaire, Natick, and Lloyd B. Smith, Scituate, Mass., assignors to Radio Corporation of America, a corporation of Delaware Filed Sept. 28, 1962, Ser. No. 226,812
2 Claims. (Cl. 340—174)

This invention relates to assemblies of magnetic elements, such as storage or memory elements, and particularly to assemblies of apertured magnetic elements of very small dimensions. The invention is useful, for example, as applied to random-access high-speed memories of electronic data processing apparatus, and also as applied to circuits such as shift registers constituted of magnetic memory elements.

Random access high-speed memories presently in use are customarily constructed of a large array of ferrite magnetic annular cores which are threaded by row and column wire conductors. Each core is threaded by at least one row wire and at least one column wire. Such memories are capable of being operated with a read-write cycle time of as low as 1.5 microseconds.

In order to make random access memories capable of even faster operating speeds, it is desirable to reduce the size of the apertures to a diameter such as 10 milli-inches, or 5 milli-inches, or even smaller. When the apertures in the cores are made this small, it is very difficult to support the cores and to thread a plurality of wires through the apertures in the cores.

It is therefore a general object of this invention to provide an improved assembly of magnetic elements having very small physical dimensions.

It is another object to provide an assembly of ferrite magnetic storage elements capable of a read-write cycle time of about one-half microsecond or less.

It is a further object to provide an assembly of magnetic storage elements characterized in being relatively easy to construct by automated production techniques.

It is yet another object to provide improved methods of constructing an array of memory elements.

According to an example of the invention, there is provided a plurality of annular ferrite magnetic memory elements each having a printed conductor extending from one side of the element to the aperture and along the wall of the aperture to the other side of the element. A sheet of insulating material is provided with rows and columns of sockets each dimensioned to receive and hold one of the memory elements. Printed conductors are provided on the insulating sheet extending in the row direction between adjacent sockets where they make electrical connection with the printed conductors on the memory elements to provide conductive paths each linking the memory elements in a row. A wire is threaded through the apertures in the memory elements of each column.

According to another example of the invention, a plurality of ferrite magnetic strips are each provided with a plurality of transverse apertures, and are provided with a printed conductor which extends along one side to an aperture, on the wall of the aperture to the other side, along the other side to the next aperture, and so on. An insulating layer is provided over the printed conductor on both sides of each strip and on the walls of the apertures. Each insulated aperture is provided with a second printed conductor extending through and covering areas of the sides of the insulated strip adjacent the aperture. A sheet of insulating material is provided with sockets or grooves dimensioned to receive and hold the magnetic strips, and is provided with printed conductors extending transversely between the grooves. The second printed conductors on the strips cooperate with the printed conductors on the sheet to form conductive paths extending through corresponding apertures in the plurality of magnetic strips.

According to a particular example of the method aspect of the invention, a magnetic memory is constructed by the steps of printing a conductor on an apertured magnetic member so that the conductor extends from one side of the member and along the wall of the aperture to the other side of the member, forming a socket or groove in a sheet of insulating material, the socket being dimensioned to receive and hold an edge of the magnetic member, printing a conductor on the insulating sheet which extends to an edge of the socket, electroplating or dip soldering a soft metal such as a low-temperature solder on at least one of the printed conductors, and pressing the magnetic member into the socket to establish electrical connections through the soft metal between the printed conductors on the magnetic member and on the sheet, and depositing a harder conductive material over the soft metal.

These and other objects and aspects of the invention will be apparent to those skilled in the art from the following more detailed description taken in conjunction with the appended drawing, wherein.

Figures 1, 2:
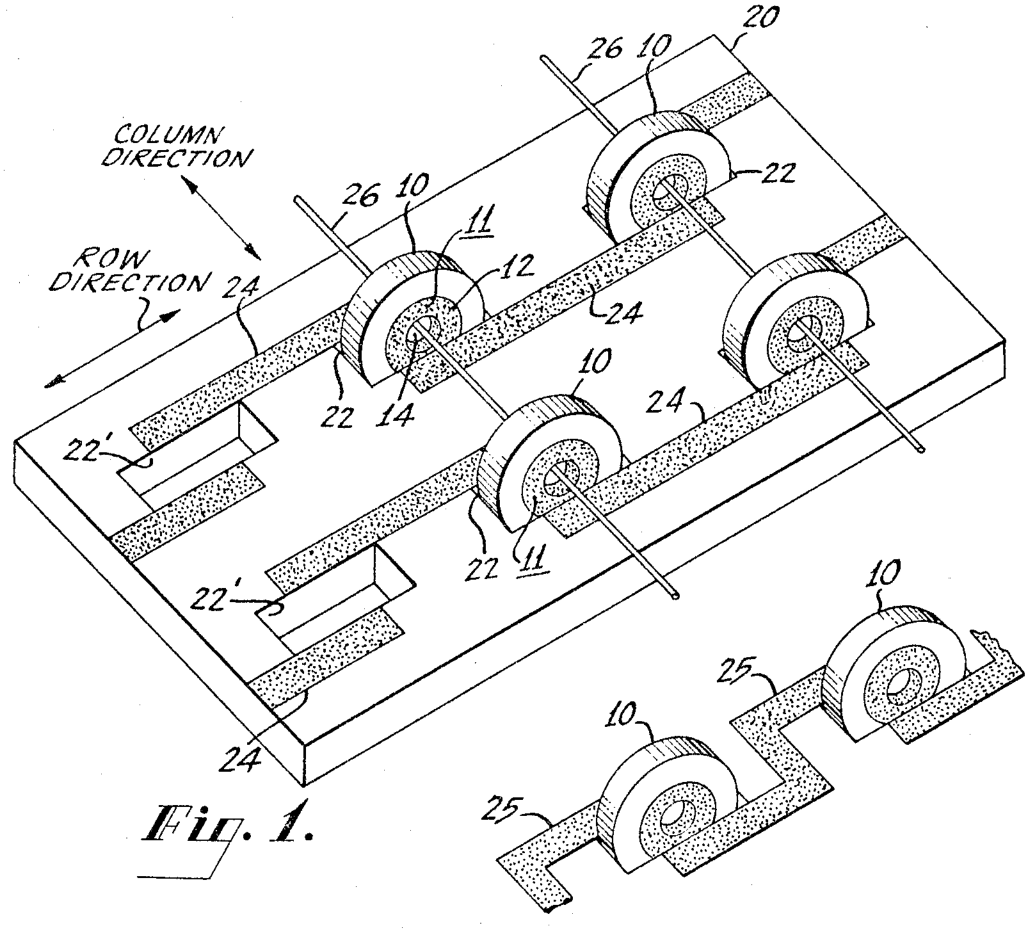
FIGURE 1 is an isometric view of a fragmentary part of a memory plane or array of memory elements constructed according to the teachings of this invention.
FIGURE 2 is an isometric view illustrating an alternative printed wiring configuration useable in place of the one shown in FIGURE 1.

Referring now in greater detail to FIGURE 1, there are shown four annular ferrite magnetic memory cores 10 in an arrangement illustrative of a memory plane having a much larger number of cores. Each core 10 has a printed conductor 11 which includes a portion 12 on one side of the core, a portion 14 on the wall of the aperture, and a portion 16 on the other side of the core, as is shown to advantage in the sectional view of FIGURE 3.

A sheet 20 of insulating material is provided with sockets 22 arranged in rows and columns. The sockets are dimensioned to snugly receive the edges of the magnetic cores 10 to a depth such that the apertures in the cores are above the top surface of the sheet 20. The insulating sheet 20 is also provided on its top surface with printed conductors 24 which extend in the row direction between adjacent sockets 22. The extent and disposition of the printed conductors 24 is shown most clearly near the sockets 22' where the cores 10 have been omitted for purposes of illustration. The printed conductors 24 cooperate with the printed conductors 11 on the cores 10 to provide conductive paths extending in the row direction through all the magnetic cores in each row. Electrical connection between the printed conductors 24 on the sheet 20 and the printed conductors 11 on the individual magnetic cores may be established by means of a soft metal such as low-temperature solder, as will be described.

The sockets 22 are accurately positioned in the column direction to facilitate the threading of wires 26, either manually or by machine, axially through the apertures of the cores 10 in a column. It will be understood that the designations "column direction" and "row direction" are purely arbitrary and are used for convenience of description.

FIGURE 2 is a fragmentary view illustrating an alternative configuration of printed conductors 25 which may be used in place of the configuration of printed conductors 24 in FIGURE 1.

Figure 3:
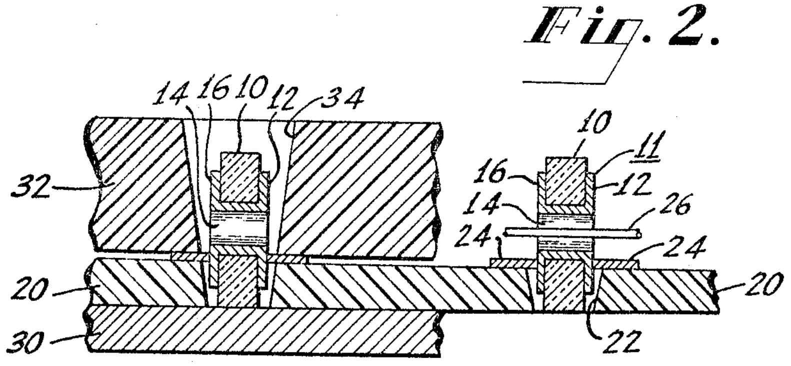
FIGURE 3 is a sectional view illustrating internal details and some steps in the method of constructing the memory plane of FIGURE 1.

The method of constructing the memory array of FIGURE 1 will now be described with references to FIGURE 3. The insulating sheet 20 may be of a material known in the trade as "Fotoceram" which is sold by Corning Glass Company. This material is a ceramic which may be provided with the sockets 22 by a photoetching process that permits the formation of accurately aligned and dimensioned sockets having small dimensions and small center-to-center spacings. The insulating sheet 20 may also be made of other insulating materials such as those suitable for the accurate punching or photoetching therein of the sockets 22. If, for example, the cores 10 are 50 milli-inches in outside diameter, 10 milli-inches in inside diameter and 10 mill-inches thick, the insulating sheet 20 should be about 10 milli-inches thick and have accurately-spaced sockets 22 which are slightly less than 50 milli-inches long and slightly more than 10 milli-inches wide.

The magnetic cores 10 are preferably constructed in the usual manner of a ferrite material providing a square hysteresis loop characteristic. Each core is provided with a printed winding on both sides and extending therebetween on the wall of the aperture of the core. The term "printed" is used herein to describe any of the many known metalizing methods for depositing a conductor on an insulating material, such as, vacuum metalization through a mask, spraying, painting and firing a conductive paste or ink, etc. The printed conductors 24 on the insulating sheet 20 are also printed by any suitable method such as those listed. Another suitable method is to employ a commercially available insulating sheet 20 having a top surface completely covered with a bonded layer of conductive material such as copper. The copper is then etched away, by a suitable photoetching process, at all places except where the conductors 24 are desired.

The printed conductor 11 on each core 10 or the printed conductor 24 on the sheet 20, or both, are provided with an additional dip soldered or electroplated layer of a soft metal or low-temperature solder which is preferably composed of indium or an alloy including indium. The solder used should have a soft buttery mechanical characteristic and should be arranged to be deformed sufficiently when a core is pressed into a socket to insure an electrical connection between the printed winding 11 on the core 10 and the printed windings 24 on the sheet 20.

The cores 10 are positioned in the sockets 22 by attaching the sheet 20 to a shaker table 30 and superimposing a funneling member 32 on top of the sheet 20. The funneling member 32 has funneling apertures 34 accurately registered with each of the sockets 22 in the sheet 20. A sufficient quantity of ferrite cores 10 are deposited on top of the funneling member 32 and the assemblage is shaken until a core is located loosely in each socket 22 of the sheet 20. The cores 10 and the sockets 22 of the sheet 20 are dimensioned so that the soft low-temperature solder on one or both of the printed conductors prevents the seating of the cores to the final position shown in FIGURE 3. The seating of the cores and the establishment of the desired electrical connection is accomplished by pressing the cores down into the sockets so that the buttery low-temperature solder is deformed and electrical connections are established. After the cores are thus properly seated and held in the sockets by the mechanical action of the soft solder, the electrical connections may be perfected by heating the core-loaded sheet (preferably with mild vibration) to fuse the solder. A harder conductive material may be electroplated over the soft solder to insure good strong electrical connection.

According to an alternative method, the use of soft solder is dispensed with by maintaining closer tolerances on the dimensions of the cores and sockets. The cores are loaded directly into the sockets of the insulating sheet by the use of a shaker table and vacuum apparatus in communication with the bottoms of the sockets. A funneling member 32 is not needed. The core-loaded insulating sheet is immersed in an electroless plating bath (preferably nickel) so that the conductors on the cores and on the sheet are built up until the gaps between them are bridged. Then additional conductive material is electroplated onto the conductors.

Bridging of the gaps between the conductors on the cores and the conductors on the insulating sheet can be accomplished by electroplating (without the electroless plating step) if all the conductors on the insulating sheet are interconnected by a conductive material that can later be easily removed. The easily removable interconnecting conductor may, for example, be toluene-soluble silver paste or an easily removable conductive tape. After the gaps are bridged by electroplating, the interconnecting paste or tape is removed by washing with a solvent or stripping.

After the cores 10 on the sheet 20 have been provided with the printed conductors extending in the row direction, as described above, wires 26 are threaded through the cores in the column direction. The wires 26 are insulated from the printed conductors by insulation on the wires 26 themselves, or by the prior application of an insulating coating to the printed conductors on the cores and on the sheet 20. If the inside diameter of each core is 10 milli-inches, the wire 26 may have a diameter of 5 milli-inches or less. The wires 26 may be threaded manually in the usual manner, or may be threaded with mechanical aids or a wire threading machine.

Figure 4:
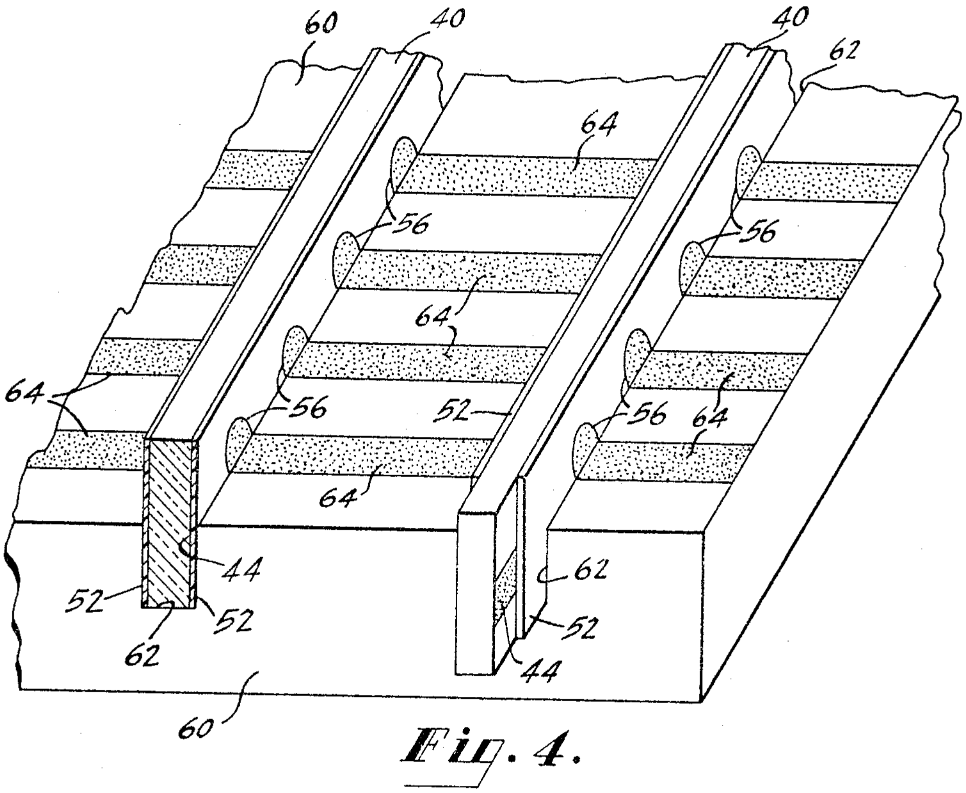
FIGURE 4 is an isometric view of another embodiment of the invention including apertured magnetic strips and including printed conductors extending in both the row and column directions.
Figures 5, 6:
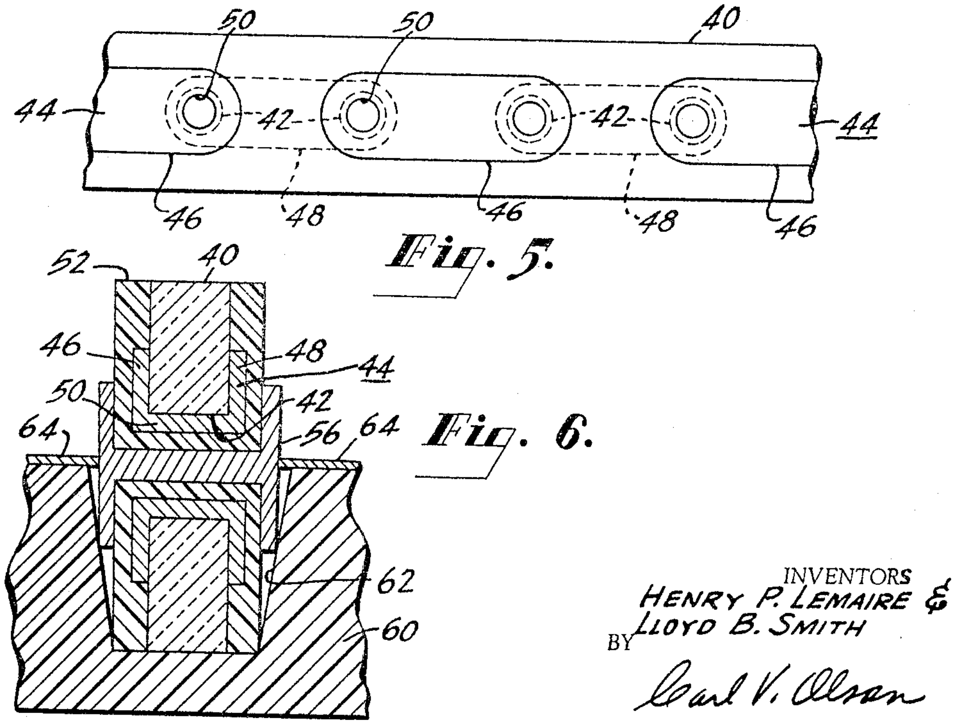
FIGURE 5 is an elevation showing the printed wiring on one magnetic strip included in the arrangement of FIGURE 4 at an intermediate stage in its construction.
FIGURE 6 is a sectional view taken through an aperture in one of the magnetic strips of FIGURE 4.

FIGURES 4, 5 and 6 illustrate another embodiment of the invention. This embodiment employs strips 40 of square loop magnetic material such as ferrite. The strips 40 are each provided with a row of apertures 42 (FIGURE 5) which define in the surrounding magnetic material the location of individual memory element. A conductive printed conductor 44 is provided extending along the magnetic strip 40 and threading in and out through the apertures. The conductor 44 consists of printed portions 46 on one side of the strip 40 extending between pairs of apertures, printed portions 48 on the other side of the strip extending between overlapping pairs of apertures, and printed portions 50 on the walls of the apertures.

The ferrite strip 40 with printed conductor 44 as shown in FIGURE 5 is next provided with a layer or coating of insulating material 52, as shown in FIGURES 4 and 6, which extends along the sides of the strip 40 and extends through the apertures therein. The insulating coating 52 may have the extent shown in the drawings or may completely cover all exposed surfaces of the strip 40. The insulated coating is conveniently applied by spraying, or by dipping the strip in a liquid insulating plastic material having a volatile solvent which evaporates leaving a solid insulating coating.

The insulated strip 40 is provided with printed conductors 56 each extending through one insulated aperture and covering areas on the sides of the insulated strip surrounding the respective aperture. The conductors 56 may completely fill the insulated apertures, as illustrated in FIGURE 6, or may cover the walls of the insulated aperture in an eyelet-like configuration. The conductors 56 may be printed by any of the known methods such as those previously mentioned.

An insulating sheet 60 is provided with sockets or grooves 62 for receiving and holding the printed magnetic strips 40. The insulating sheet 60 is also provided with printed conductors 64 extending transversely between the sockets or grooves 62. The printed conductors 64 on the sheet 60 are arranged to be registered with the conductors 56 on the insulated magnetic strips 40 to provide continuous conductive paths extending through corresponding apertures in the plurality of strips 40. The memory arrays of FIGURE 4 are then seen to consist of rows and columns of memory elements in the magnetic material immediately surrounding each aperture. The memory elements in what may be called the row direction are linked by conductors 64 and 56, and the memory elements in what may be called the column direction are linked by conductors 44.

The assembly of the printed magnetic strips 40 into the sockets or grooves in the insulated sheet 60 is accomplished by the method (described in connection with FIGURES 1–3) including the electroplating or dip soldering of a soft low-temperature solder on the printed conductors 56 on the strips, or on the printed conductors 64 on the insulating sheet 60, or on both sets of printed conductors. The dimensions of the printed strips 40 and the dimensions of the sockets or grooves 62 are selected so that the insertion of a strip 40 into a socket involves the deformation of the butter-like solder on one or both of the sets of printed conductors. The use of the soft solder in the manner described insures the establishment of electrical connections between the printed conductors 56 and 64, and provides a mechanically snug fit between the parts which would not be realizable with rigid parts having producible tolerances. The electrical connections provided by the soft solder may be perfected by heating the assemblage to fuse the solder and/or by electroless plating and electroplating.

What is claimed is:

1. The combination of a plurality of magnetic strips each provided with a plurality of transverse apertures arranged in a row along the strip, a first printed conductor on each strip extending along one side to an aperture, on the wall of the aperture to the other side, along the other side to the next aperture, and so on, an insulating layer over said printed conductor on both sides of each strip and on the walls of the apertures, a plurality of second printed conductors each extending through one insulated aperture and covering areas on the sides of the insulated strip adjacent the aperture, a sheet of insulating material provided with grooves dimensioned to receive and hold said strips, and printed conductors on said sheet extending transversely between said grooves and connected to said second printed conductors on said strip to form continuous conductive paths extending through corresponding apertures in the plurality of strips.

2. A memory comprising a plurality of ferrite magnetic strips each provided with a plurality of transverse apertures arranged in a row along the strip, a first printed conductor on each strip extending along one side to an aperture, on the wall of the aperture to the other side, along the other side to the next aperture and so on, an insulating layer over said printed conductor on both sides of each strip and on the walls of the apertures, a plurality of second printed conductors each extending through one insulated aperture and covering areas on the sides of the insulated strip adjacent the aperture, a sheet of insulating material provided with grooves dimensioned to receive and hold said strips, printed conductors on said sheet extending transversely between said grooves and in registry with said second printed conductors on said strips, and soft metal connecting the ends of the printed conductors on said sheet to respective ones of said second printed conductors on the sides of said strips to form continuous conductive paths extending through corresponding apertures in the plurality of strips.

References Cited by the Examiner

UNITED STATES PATENTS

| | | | |
|---|---|---|---|
| 2,877,540 | 3/1959 | Austen | 29—155.5 |
| 2,961,745 | 11/1960 | Smith | 29—155.5 |
| 2,985,948 | 5/1961 | Peters | 340—174 |
| 3,104,380 | 9/1963 | Haibt | 340—174 |
| 3,105,959 | 10/1963 | Klinkhamer | 340—174 |
| 3,130,134 | 4/1964 | Jones | 340—174 |
| 3,155,948 | 11/1964 | Stern | 340—174 |
| 3,196,522 | 7/1965 | Bernstein et al. | 340—174 |

BERNARD KONICK, *Primary Examiner.*

IRVING SRAGOW, *Examiner.*

G. LIEBERSTEIN, M. K. KIRK, *Assistant Examiners.*